United States Patent
Tajima et al.

(10) Patent No.: US 8,944,653 B2
(45) Date of Patent: Feb. 3, 2015

(54) VEHICLE LAMP

(71) Applicants: Takehiko Tajima, Shizuoka (JP); Akinori Matsumoto, Shizuoka (JP)

(72) Inventors: Takehiko Tajima, Shizuoka (JP); Akinori Matsumoto, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 69 days.

(21) Appl. No.: 13/658,867

(22) Filed: Oct. 24, 2012

(65) Prior Publication Data

US 2013/0107558 A1    May 2, 2013

(30) Foreign Application Priority Data

Oct. 28, 2011    (JP) ................................. 2011-236696

(51) Int. Cl.
*F21S 8/10*    (2006.01)
*B60Q 1/02*    (2006.01)

(52) U.S. Cl.
CPC ........... *F21S 48/145* (2013.01); *F21S 48/1382* (2013.01); *B60Q 1/02* (2013.01); *F21S 48/1323* (2013.01)
USPC ........... 362/539; 362/516; 362/514; 362/509; 362/520; 362/507

(58) Field of Classification Search
CPC ...... B60Q 1/02; F21S 48/1382; F21S 48/145; F21S 48/1323; F21S 48/1388; F21S 48/1778; F21S 48/1216; F21S 48/1352
USPC ........................... 362/539, 284, 297, 507–519
See application file for complete search history.

(56) References Cited

U.S. PATENT DOCUMENTS

| | | | | |
|---|---|---|---|---|
| 5,902,039 A * | 5/1999 | Futami | ........................... | 362/539 |
| 6,280,071 B1 | 8/2001 | Yamamoto et al. | | |
| 6,435,703 B2 * | 8/2002 | Takada | ........................... | 362/517 |
| 6,607,295 B2 * | 8/2003 | Hayakawa | ..................... | 362/517 |
| 6,857,768 B2 * | 2/2005 | Watanabe et al. | ............. | 362/512 |
| 6,953,272 B2 * | 10/2005 | Hayakawa et al. | ........... | 362/517 |
| 7,036,969 B2 * | 5/2006 | Foust et al. | .................... | 362/539 |
| 7,186,009 B2 * | 3/2007 | Yamamura et al. | ........... | 362/517 |
| 7,766,523 B2 * | 8/2010 | Kinoshita et al. | ............. | 362/539 |

(Continued)

FOREIGN PATENT DOCUMENTS

| | | |
|---|---|---|
| CN | 2625203 Y | 7/2004 |
| CN | 101298906 A | 11/2008 |
| EP | 0 843 126 A2 | 5/1998 |

(Continued)

OTHER PUBLICATIONS

English Patent Abstract of JP 2009-104790, from esp@cenet; Publication Date: May 14, 2009 (1 Page).

(Continued)

*Primary Examiner* — Jong-Suk (James) Lee
*Assistant Examiner* — Arman B Fallahkhair
(74) *Attorney, Agent, or Firm* — Osha Liang LLP

(57) ABSTRACT

A vehicle lamp is provided with: a projection lens; a light source; a reflector that reflects light from the light source to the projection lens; and a shade member. A shade member includes an opening, and a portion of an inner peripheral edge of the opening is defined by an upper edge of a shading part for shielding a portion of the light reflected on the reflector. A side end portion of a reflection surface of the reflector penetrates the opening of the shade member and extends forward beyond the shading part.

3 Claims, 5 Drawing Sheets

(56) References Cited

U.S. PATENT DOCUMENTS

2003/0086277 A1    5/2003    Hayakawa et al.
2005/0063192 A1*    3/2005    Tatara et al. .................. 362/512

FOREIGN PATENT DOCUMENTS

| | | |
|---|---|---|
| EP | 1 559 952 A2 | 8/2005 |
| EP | 2 189 712 A2 | 5/2010 |
| JP | 2000156106 A | 6/2000 |
| JP | 2009104790 A | 5/2009 |
| JP | 2010033740 A | 2/2010 |
| JP | 2010-165633 A | 7/2010 |

OTHER PUBLICATIONS

English Patent Abstract of JP 2010-033740, from esp@cenet; Publication Date: Feb. 12, 2010 (1 Page).

European Search Report issued in European Application No. 12190184.7 mailed Feb. 13, 2013 (4 pages).

Patent Abstracts of Japan; Publication No. 2010165633 dated Jul. 29, 2010 (1 page).

Chinese Office Action for Application No. 201210422223.8, mailed on Jul. 17, 2014 (13 pages).

* cited by examiner

VEHICLE LAMP

BACKGROUND OF THE INVENTION

1. Field of the Invention

The invention relates to a projector type vehicle lamp including a shading part.

2. Related Art

In general, in a projector type vehicle lamp, light from a light source disposed on a rear side of a rear focal plane of a projection lens is reflected to the projection lens by a reflector.

In such a projector type vehicle lamp, in order to form a light distribution pattern having a cutoff line on an upper end portion thereof, a portion of the reflected light is shielded by a shading part. The shading part is disposed in such a way that an upper edge of the shading part passes through a rear focal point of the projection lens or a vicinity of the rear focal point, for example, as disclosed in Patent Documents 1 to 3.

Patent Document 1: JP-A-2000-156106
Patent Document 2: JP-A-2009-104790
Patent Document 3: JP-A-2010-033740

In the structure of Patent Document 1, the upper edge of the shading part is formed on an inner peripheral edge of an opening of a shade member.

In the structure of Patent Document 2, second right and left reflectors are disposed in front of the upper portion of the shading part.

In general, the light distribution pattern from the projector type vehicle lamp has a tendency in that a forward region at a short range of a road surface in front of the vehicle excessively brightens and both right and left regions thereof get dark.

If the shading part is formed on the upper edge of the opening in the shade member such like the structure of Patent Document 1, it is possible to shield a portion of the reflected light, which passes through a position significantly spaced upward apart from the upper edge of the shading part, at an upper portion of the opening of the shade member. Since the forward region at the short range of the road surface in front of the vehicle does not excessively brighten, it is possible to prevent a relatively less visibility at both right and left regions.

However, even if the this configuration is employed, there is a problem in that brightness of both right and left regions at the short range of the road surface in front of the vehicle cannot be positively increased.

If the pair of second right and left reflectors are disposed upward in front of the shading part such like the structure of Patent Document 2, the reflected light from the second reflectors is added to the reflected light from the reflector, so that the brightness of both right and left regions at the short range of the road surface in front of the vehicle can be increased.

However, even if this configuration is employed, there is a problem in that it is not possible to prevent the forward region at the short range of the road surface in front of the vehicle from excessively brightening due to the reflected light, which passes through the position significantly spaced upward apart from the upper edge of the shading part.

In addition, according to the above configuration, there is another problem in that since the pair of second right and left reflectors are required in addition to the reflector, a cost of the lamp is increased by the increased number of components.

SUMMARY OF THE INVENTION

One or more embodiments of the invention provide a projector type vehicle lamp including a shade member which can improve visibility at a short range of a road surface in front of the vehicle, while suppressing a cost.

DETAILED DESCRIPTION OF THE EMBODIMENTS

Hereinafter, an embodiment will be explained with reference to the accompanying drawings.

Figure 1:
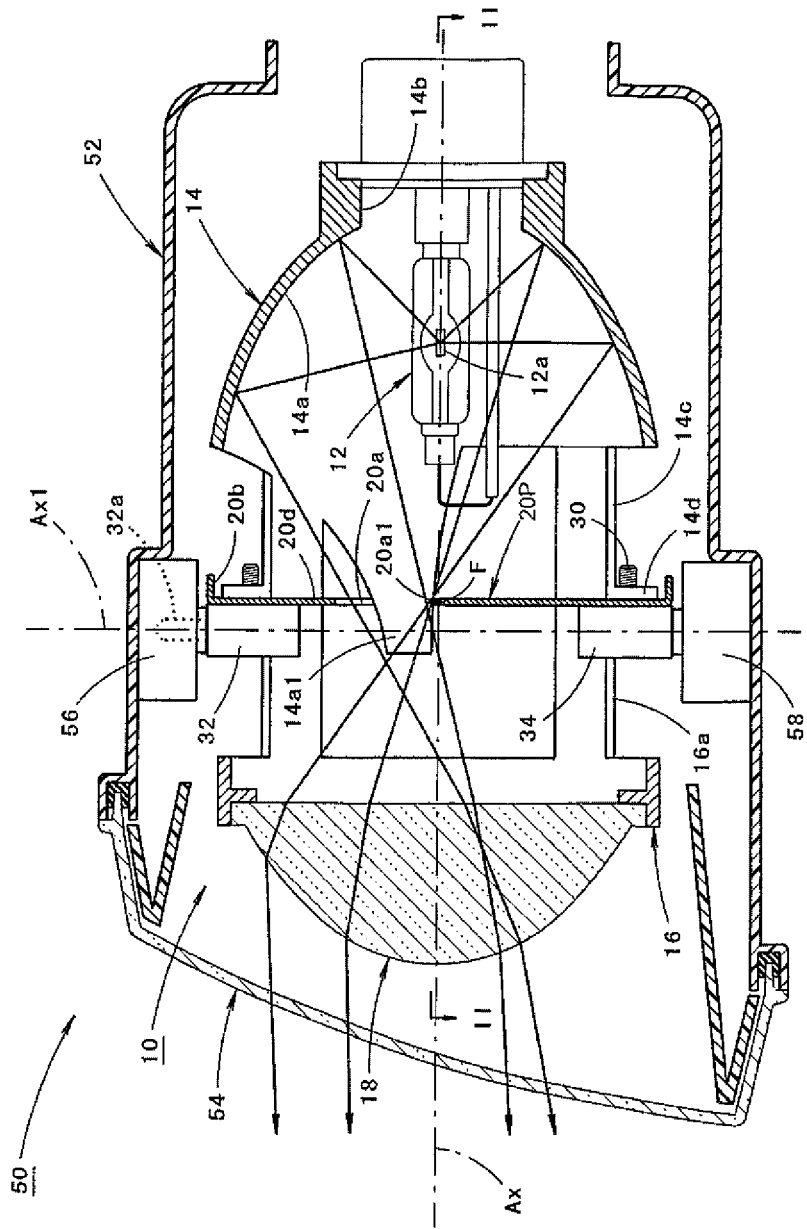
FIG. 1 is a side cross-sectional view illustrating a headlamp mounted with a vehicle lamp according to one embodiment.

FIG. 1 is a side cross-sectional view illustrating a headlamp 50 mounted with a vehicle lamp 10 according to one embodiment.

As illustrated in the drawing, the vehicle lamp 10 according to this embodiment is disposed in a lamp chamber constituted of a lamp body 52 and a translucent cover 14 disposed at a front-end opening of the lamp body 52, as a projector type lamp unit.

Figure 2:
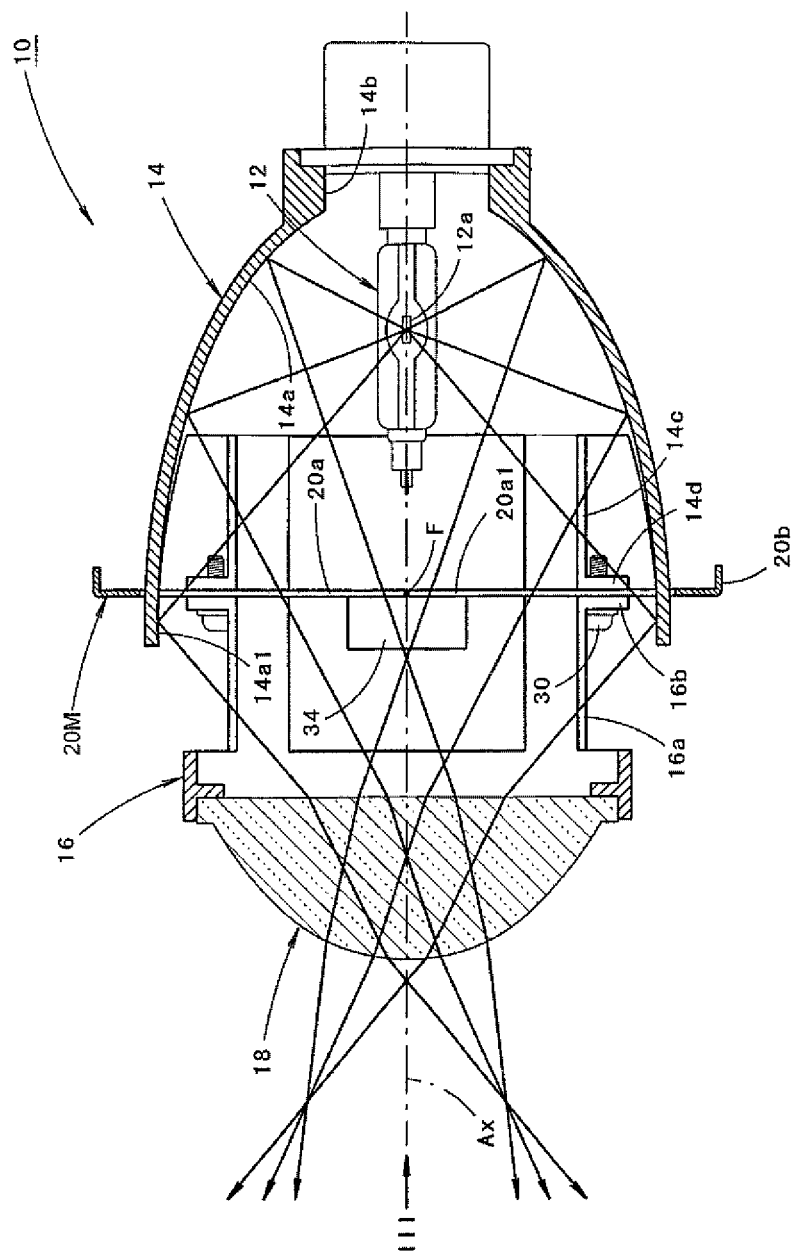
FIG. 2 is a cross-sectional view taken along the line II-II in FIG. 1.
Figure 3:
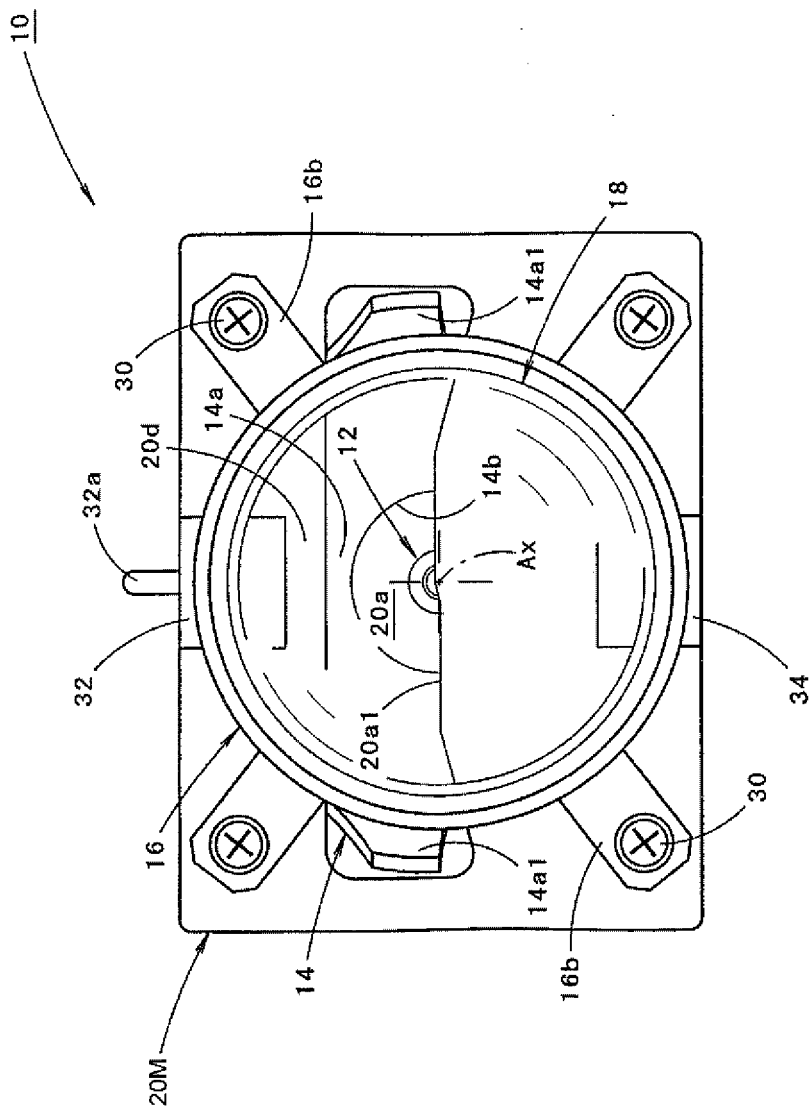
FIG. 3 is a diagram taken along the arrow III in FIG. 2.
Figure 4:
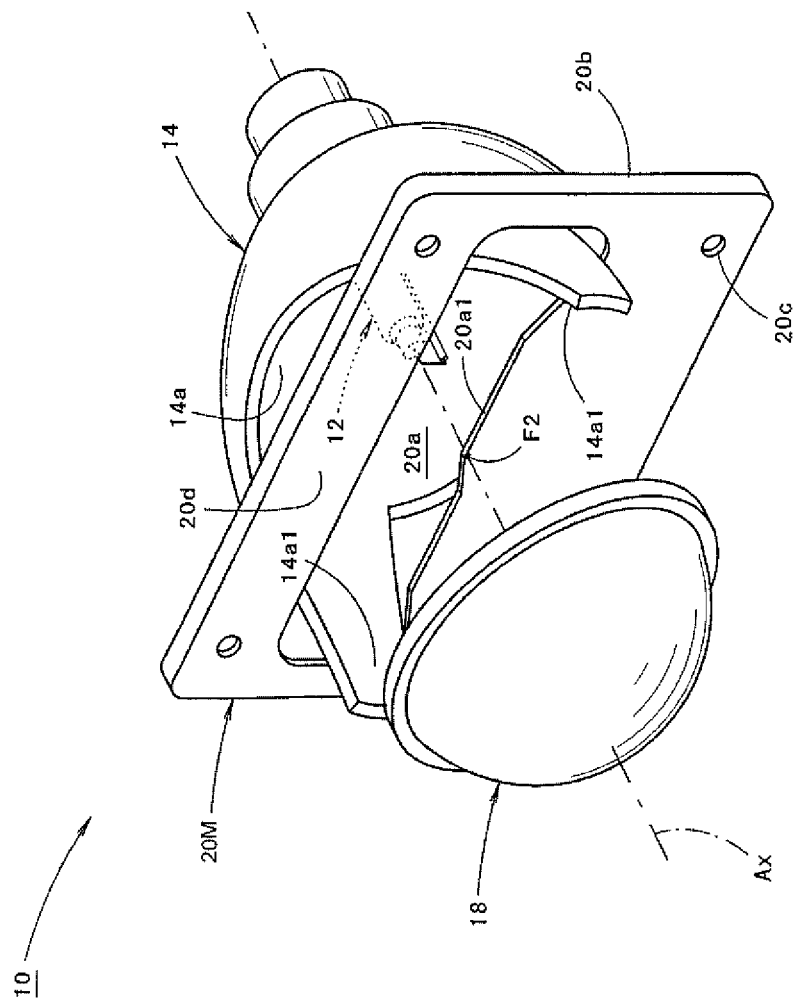
FIG. 4 is a perspective view illustrating major constitutional elements of the vehicle lamp.

FIG. 2 is a cross-sectional view taken along the line II-II in FIG. 1 to illustrate the vehicle lamp 10. FIG. 3 is a diagram taken along the arrow III in FIG. 2. Also, FIG. 4 is a perspective view illustrating major constitutional elements of the illumination As illustrated in the drawing, the illumination lamp 10 of vehicles includes a light source bulb 12, a reflector 14, a lens holder 16, a projection lens 18, and a shade member 20M.

The projection lens 18 is formed from a plano-convex aspheric lens having a substantially convex surface as a front surface and a substantially planar surface as a back surface, and is disposed so that its optical axis Ax extends in a front and rear direction of the vehicle. The projection lens 18 is configured such that an image on a rear focal plane (that is, a focal plane including a rear focal point F of the projection lens 18) is projected on an imaginary vertical screen disposed in front of the lamp as a reversed image thereof.

The light source bulb 12 is a discharge bulb which employs a discharge light-emitting section as a light source 12a. The light source 12a of the light source bulb 12 is configured as a line segment light source extending parallel to the optical axis Ax, and is disposed at a rear side rather than the rear focal point F of the projection lens 18.

The reflector 14 has a reflection surface 14a for reflecting light from the light source 12a towards the projection lens 18.

The reflection surface 14a has a substantially elliptical cross-sectional profile along a plane including the optical axis Ax, and is configured such that the eccentricity of the ellipse gradually increases from a vertical cross section toward a horizontal cross section. By virtue of the above configuration, the light, which is originated at the light source 12a and is reflected by the reflection surface 14a, substantially converges in the vicinity of the rear focal point F within the vertical cross sectional plane. The convergence point is displaced forward to a large extent in the horizontal cross sectional plane.

The reflector 14 is configured such that four arm portions 14c extending from a front edge of the reflection surface 14a towards the front side are formed in a circumferential direction at a predetermined interval. A front end portion of each arm portion 14c is bent outward in a diameter direction to form a flange portion 14d.

The lens holder 16 is disposed in front of the reflector 14, and a front end portion of the lens holder 16 fixedly supports the projection lens 18. The lens holder 16 is configured such that four arm portions 16a extending from a front edge thereof towards the rear side are formed in a circumferential direction at a predetermined interval. A rear end portion of each arm portion 16a is bent outward in the diameter direction to form a flange portion 16d.

A shading part 20P in the shade member 20M is disposed such that an upper edge 20a1 of the shading part passes above and near the rear focal point F of the projection lens 18. With the configuration, a portion of a light reflected from the reflector 14 is shielded.

The shade member 20M is a press-formed product made of a metallic plate-shaped member, and is disposed along a vertical plane perpendicular to the optical axis Ax at the rear focal point F of the projection lens 18.

The upper edge 20a1 of the shading part 20P is formed such that its portion positioned at a left side (right side when seen from a front side of the lamp, and the same hereinafter) rather than the optical axis Ax is horizontally extended from the optical axis Ax in a left direction to a certain extent at a position slightly higher than a horizontal plane including the optical axis Ax, and then is extended obliquely downward. Meanwhile, its portion positioned at a right side rather than the optical axis Ax is slightly extended downward from the optical axis Ax in a right direction, is horizontally extended to a certain extent, and then is extended obliquely downward.

The shade member 20M has an opening 20a in which the upper edge 20a1 of the shading part 20P is formed as a portion of the inner peripheral edge of the opening 20a of the shade member 20M. To achieve this, the shade member 20M has portions extended upward from both right and left sides of the upper edge 20a1 of the shading part 20P which are connected to each other over the opening 20a. In this instance, an upper portion 20d positioned over the opening 20a is formed such that its lower edge of the an upper portion 20d (that is, an upper inner peripheral edge of the opening 20a) is extended in a horizontal direction over a predetermined distance (for example, approximately 15 to 25 mm) from the horizontal plane including the optical axis Ax.

The shade member 20M has an outer peripheral edge of an oblong shape, and its outer peripheral edge is bent rearward so that a flange portion 20b is formed over an overall circumference thereof.

The shade member 20M is fixed to the reflector 14 and the lens holder 16 in a vicinity of the opening 20a. Specifically, the shade member 20M is fastened by screws 30 at four locations, that is, oblique upper positions from right and left sides of the opening and oblique lower positions from the right and left sides of the opening on the basis of the optical axis Ax, with it being interposed between a flange portion 14d of each arm portion 14c in the reflector 14 and a flange portion 16b of each arm portion 16a in the lens holder 16. To achieve the end, the shaped 20 is provided with screw insertion through-holes 20c at four locations. Also, each flange portion 16b of the lens holder 16 is provided with a screw insertion through-hole (not illustrated), and each flange portion 14d of the reflector 14 is provided with a threaded hole (not illustrated).

The vehicle lamp 10 is supported by both upper and lower sides of the opening 20a of the shade member 20M such that it can be pivoted in a right and left direction with respect to the lamp body 52.

In order to support the vehicle lamp 10, pivot support members 32 and 34 are respectively attached to positions of both upper and lower sides of the opening 20a on the front surface of the shade member 20M. The pivot support members 32 and 34 are supported such that they are pivoted around the vertical axis Ax1, which passes through the optical axis Ax and extends in a vertical direction, with respect to a receiver 56 and an actuator 58 which are both upper and lower walls of the lamp body 52.

The upper surface of the pivot support member 32 is provided with a pin 32a which is inserted into the receiver 56, and the lower surface of the pivot support member 32 is provided with an engaging hole (not illustrated) which is engaged with an output shaft (not illustrated) of the actuator 58.

The vehicle lamp 10 includes a swivel mechanism for swiveling the illumination lamp in a right and left direction by drive of the actuator 58.

The reflector 14 is formed such that both right and left end portions 14a1 of the reflection surface 14a penetrate the opening 20a of the shade member 20M to extend forward rather than the shading part 20P. In this instance, both right and left end portions 14a1 protrude forward in about 5 to 20 mm (for example, 10 mm) from the shading part 20P.

The light from the light source 12a, which is reflected from both right and left end portions 14a1 and is incident onto the projection lens 18, is emitted at a large defection angle from the projection lens 18.

Figure 5:
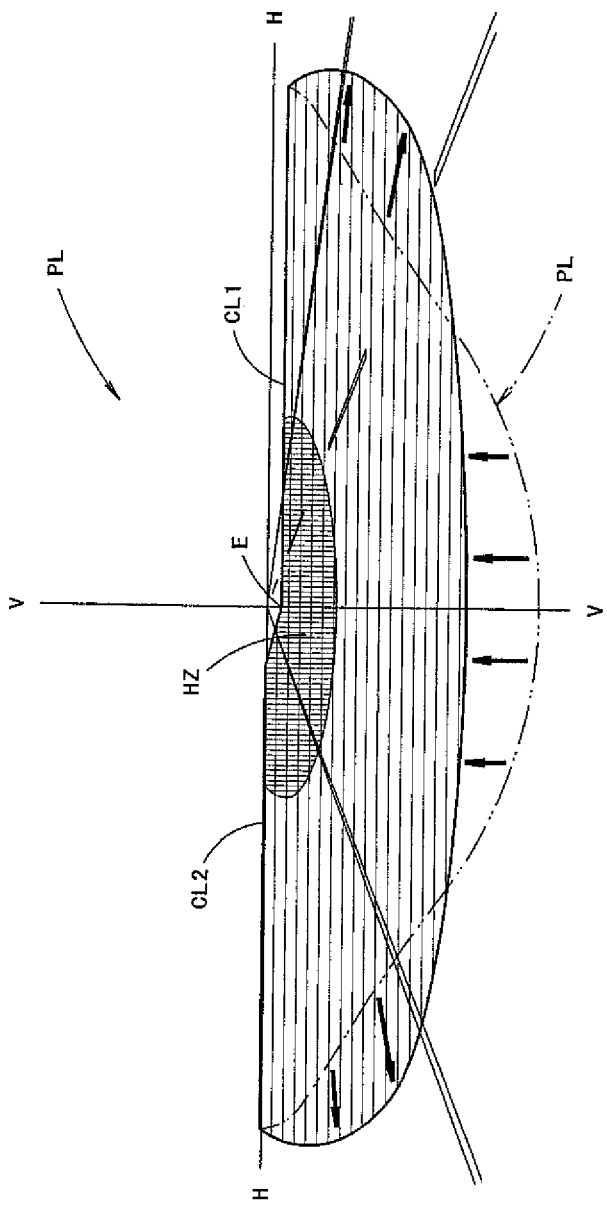
FIG. 5 is a diagram illustrating a low-beam light distribution pattern formed on a virtual vertical screen disposed in a forward position of 25 m from the lamp by the light irradiated in a forward direction by the vehicle lamp.

FIG. 5 is a diagram illustrating a low-beam light distribution pattern formed on the virtual vertical screen disposed in a forward position of 25 m from the lamp by the light irradiated in a forward direction by the vehicle lamp 10.

The low-beam light distribution pattern PL is a left-oriented low-beam light distribution pattern. The pattern PL has, at an upper edge thereof, cutoff lines CL1 and CL2 which differ in level on the right and the left sides thereof. The cutoff lines CL1 and CL2 extend substantially horizontally so as to differ in level on the right and the left sides with a line V-V vertically passing through a point H-V therebetween. The point H-V is a vanishing point in the front direction of the lamp. In this instance, the cutoff line CL1 which is on the right of the line V-V and corresponds to the opposite lane is formed to extend in a horizontal direction over its substantially overall distance, while the cutoff line CL2 which is on the left of the line V-V and corresponds to the vehicle's own lane is formed to be stepped-ascended from a left-end position of the cutoff line CL1 with a sloped section therebetween.

The low-beam light distribution pattern PL is formed by projecting an image of the light source 12a, which is formed on the rear focal plane of the projection lens 18 by the light from the light source 12a reflected from the reflection surface 14a of the reflector 14, onto the imaginary vertical screen by the projection lens 18 as an inverted projection image. The cutoff lines CL1 and CL2 which differ in level on the right and the left sides thereof are formed as the inverted projection image of the upper edge 20a1 of the shading part 20P.

In the low-beam light distribution pattern PL, an elbow point E, which is an intersection of the lower cutoff line CL1 and the line V-V, is formed at a location situated at about 0.5 to 0.6 degrees below the point H-V. This is caused by that a portion of the upper edge 20a1 of the shading part 20P which is positioned on the left of the optical axis Ax is horizontally extended in the left direction from the optical axis Ax slightly above the horizontal plane including the optical axis Ax. In the low-beam light distribution pattern PL, a hot zone HZ, which is a high-intensity region, is formed to surround the elbow point E.

In the above drawing, a low-beam light distribution pattern PL', of which a profile thereof is represented by a two-dotted line, is, for example, a light distribution pattern in a case where the shade member 20M does not have a portion which is positioned above the upper edge 20a1 of the shading part 20P. Also, the low-beam light distribution pattern PL' is a light distribution pattern in a case where both right and left end portions 14a1 protruding forward rather than the shading part 20P is not formed on the reflection surface 14a of the reflector 14.

Since the lower edge of the low-beam light distribution pattern PL' is formed to be convex to a considerably lower position at the immediate vicinity of the line V-V, the forward region at the short range of the road surface in front of the vehicle brightens excessively. Meanwhile, since the portions positioned at both right and left sides of the immediate vicinity of the line V-V on the lower edge is upward concave, both right and left regions at the short range of the road surface in front of the vehicle get dark.

However, since the lower edge of the low-beam light distribution pattern PL is formed to extend in a substantially horizontal direction at the position which is not so low, the immediate vicinity of the line V-V is not convex downward. As a result, the forward region at the short range of the road surface in front of the vehicle does not brighten excessively. Meanwhile, since the portions positioned at both right and left sides of the immediate vicinity of the line V-V on the lower edge is convex obliquely downward in the right and left direction, as compared to the case of the low-beam light distribution pattern PL'. Therefore, since the upward concave is reduced, both right and left regions at the short range of the road surface in front of the vehicle brighten.

In the low-beam light distribution pattern PL, the reason why the lower edge thereof is extended in a substantially horizontal direction at the position which is not so low is that the lower edge of the upper portion 20d of the shading part 20P is formed to extend in the horizontal direction, and, of the light reflected from the reflector 14 on the upper portion 20d, the light passing through the position which is largely spaced upward apart from the upper edge 20a1 of the shading part is shielded.

Also, in the low-beam light distribution pattern PL, the reason why the portions positioned at both right and left sides of the immediate vicinity of the line V-V on the lower edge is convex obliquely downward in the right and left direction is that the light from the light source 12a, reflected from both right and left end portions 14a1 of the reflection surface 14a of the reflector 14, is emitted at the large deflection angle in both right and left directions from the projection lens 18.

The working effects of this embodiment will now be described.

The vehicle lamp 10 according to this embodiment is configured as the lamp unit of the projector type, and also is configured to shield a portion of the light reflected from the reflector 14 by the shade member 20M which is disposed such that the upper edge 20a1 of the shading part 20P passes through the upward vicinity of the rear focal point F of the projector lens 18. Since the shade member 20M has the opening 20a in which the upper edge of the shading part 20P is formed as a portion of the inner peripheral edge of the opening 20a of the shade member 20M, the light passing the position largely spaced upward apart from the upper edge 20a1 of the shading part 20P can be shielded by the upper portion 20d of the opening 20a. In this way, since the forward region at the short range of the road surface in front of the vehicle does not brighten excessively, it is possible to prevent a relatively less visibility at both right and left sides.

Also, the vehicle lamp 10 according to this embodiment can use the reflected light from both right and left end portions 14a1 of the reflection surface 14a of the reflector 14 as a light for forming the low-beam light distribution pattern PL, since both right and left end portions 14a1 of the reflection surface 14a of the reflector 14 is formed to penetrate the opening 20a of the shade member 20M to extend forward rather than the shading part 20P. In this instance, since the reflected light from both right and left end portions 14a1 of the reflection surface 14a of the reflector 14 goes through the projection lens 18, and then orients both right and left sides, it is possible to brightly irradiate both right and left portions at the short range of the road surface in front of the vehicle. In addition, this can be achieved, without newly disposing a pair of second right and left reflectors, like the related art.

According to this embodiment, the projector type vehicle lamp 10 including the shade member 20M can improve the visibility at the short range of the road surface in front of the vehicle, while suppressing a lamp cost.

According to this embodiment, since the shade member 20M is made of a plate-shaped member, it can be manufactured at a low price by press machining or the like. Since the shade member 20M is fixed to the lens holder 16 for holding the projection lens 18 and the reflector 14 around the opening 20a, a rigidity of the shade member 20M can be sufficiently secured.

Moreover, since the shade member 20M is supported such that it can be pivoted at both upper and lower sides of the opening 20a in the right and left direction with respect to the lamp body 52, an inexpensive swivel mechanism using the shade member 20M can be implemented.

In the above embodiment, the vehicle lamp 10 has been described to form the left-oriented low-beam light distribution pattern, but the same working effect can be obtained by employing the same configuration as that of the above embodiment in the case where it is configured to form a right-oriented low-beam light distribution pattern. Also, the same working effect can be obtained by employing the same configuration as that of the above embodiment in the case where it is configured to form a light distribution pattern for a fog lamp.

Meanwhile, the numeric values illustrated as specifications in the embodiment described above are merely examples, and they may be of course be set to different values as needed.

As described in the above, in accordance with embodiments, a vehicle lamp 10 may include: a projection lens 18; a light source 12a disposed at a rear side of a rear focal point F of the projection lens 18; a reflector 14 that reflects light from the light source 12a to the projection lens 18; a shading part 20P having an upper edge 20a1 which is disposed passing through the rear focal point F of the projection lens 18 or a vicinity of the rear focal point F and shields a portion of the light reflected on the reflector; a shade member 20M including an opening 20a, wherein an upper edge 20a1 of the shading part 20P is formed as a portion of an inner peripheral edge of the opening 20a of the shade member 20M; and a side end portion 14a1 of a reflection surface 14a of the reflector 14 which penetrates the opening 20a of the shade member 20M to extend forward beyond the shading part.

According to the embodiments, a kind of the light source is not specifically limited, and, for example, a light emitting portion of a discharge bulb or a filament of a halogen bulb can be employed.

According to the embodiments, as far as the upper edge of the shading part forms a portion of the inner peripheral edge of the opening of the shade member, concrete configurations of the shading part and the shade member are not specifically limited. The shading part may be configured as a stationary shading part, or may be configured as a movable shading part.

According to the embodiments, as far as the reflector has both right and left end portions of the reflection surface penetrate the opening of the shade member to extend the front further than the shading part, the concrete configuration, for example, a forward protruding amount from the shading part or the forward protruding shape, is not specifically limited.

According to the embodiments, the vehicle lamp is configured as the projector type lamp unit. The vehicle lamp is also configured to shield a portion of the light reflected from the reflector by the shading part which is disposed such that the upper edge of the shading part passes through the upward vicinity of the rear focal point of the projector lens. Since the upper edge of the shading part is formed on the inner peripheral edge of the opening of the shade member, the light passing the position largely spaced upward apart from the upper edge of the shading part can be shielded by the upper portion of the opening. In this way, since the forward region at the short range of the road surface in front of the vehicle does not excessively brighten, it is possible to prevent a relatively less visibility at both right and left sides.

Moreover, the vehicle lamp of the embodiment can use the reflected light from both right and left end portions of the reflection surface of the reflector as a light for forming the low-beam light distribution pattern, since both right and left end portions of the reflection surface of the reflector is formed to penetrate the opening of the shade member to extend forward beyond the shading part. In this instance, since the reflected light from both right and left end portions of the reflection surface of the reflector goes through the projection lens, and then orients both right and left sides, it is possible to brightly irradiate both right and left portions at the short range of the road surface in front of the vehicle. In addition, this can be achieved, without newly disposing a pair of second right and left reflectors, like the related art.

According to the embodiments, the projector type vehicle lamp including the shade member can improve the visibility at the short range of the road surface in front of the vehicle, while suppressing a cost.

In the above configuration, the shade member 20M may be made of a plate-shaped member. As a result, the shade member 20M may be manufactured at a low price by press machining or the like. The shade member 20M may be fixed to a lens holder 16 that holds the projection lens 18 and/or the reflector 14. As a result, a rigidity of the shade member 20M can be sufficiently secured.

In the above configuration, if the shade member is supported such that it can be pivoted at both upper and lower sides of the opening in the right and left direction with respect to the lamp body, an inexpensive swivel mechanism using the shade member can be implemented.

What is claimed is:

1. A vehicle lamp comprising: a projection lens; a light source disposed at a rear side of a rear focal point of the projection lens; a reflector that reflects light from the light source to the projection lens; a shade member being made of a plate-shaped member, the shade member being disposed along a vertical plane perpendicular to an optical axis of the light source, and the shade member comprising a shading part; the shading part includes an upper edge passing through the rear focal point of the projection lens or a vicinity of the rear focal point and shields a portion of the light reflected on the reflector; the shade member further comprising an opening, wherein the upper edge of the shading part is formed as a part of an inner peripheral edge of the opening of the shade member, and wherein a side end portion of a reflection surface of the reflector penetrates through the opening of the shade member to extend forward beyond the shading part.

2. The vehicle lamp according to claim 1, wherein the shade member is fixed to a lens holder that holds the projection lens and the reflector.

3. The vehicle lamp according to claim 1 further comprising: a lamp body which accommodates the projection lens, the light source, the reflector, and the shade member therein, and wherein the shade member is supported at both upper and lower sides of the opening so as to be pivotable in a right and left direction with respect to the lamp body around the optical axis.

* * * * *